United States Patent
Schneider et al.

(10) Patent No.: US 6,318,061 B1
(45) Date of Patent: Nov. 20, 2001

(54) METHOD AND APPARATUS FOR PRODUCING A CABLE

(75) Inventors: Reiner Schneider, Ebserdorf; Edgar Heinz, Steinach; Thomas Müller, Sonneberg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,383

(22) PCT Filed: Aug. 6, 1998

(86) PCT No.: PCT/DE98/02264

§ 371 Date: Feb. 8, 2000

§ 102(e) Date: Feb. 8, 2000

(87) PCT Pub. No.: WO99/07539

PCT Pub. Date: Feb. 18, 1999

(30) Foreign Application Priority Data

Aug. 8, 1997 (DE) .............................................. 197 34 420

(51) Int. Cl.[7] .................................................... D02G 3/36
(52) U.S. Cl. ........................................................ 57/7; 57/13
(58) Field of Search .............................. 57/210, 217, 223, 57/3, 7, 13, 16, 17, 18, 12, 221; 425/113, 114; 264/171.13, 171.14, 171.15, 172.11, 172.15

(56) References Cited

U.S. PATENT DOCUMENTS

| | | | |
|---|---|---|---|
| 3,405,426 | * 10/1968 | Donald | 425/113 |
| 3,800,019 | * 3/1974 | Parsey et al. | 264/102 |
| 3,856,447 | * 12/1974 | Schiesser | 425/114 |
| 3,869,235 | * 3/1975 | Moore | 425/113 |
| 4,017,579 | * 4/1977 | Roe et al. | 264/511 |
| 4,100,240 | * 7/1978 | Bassani | 264/108 |
| 4,111,621 | * 9/1978 | Otani | 425/97 |
| 4,671,761 | 6/1987 | Adrain et al. . | |
| 4,822,548 | * 4/1989 | Hempel | 264/209 |
| 5,049,331 | 9/1991 | Hempel . | |
| 5,283,014 | 2/1994 | Oestreich et al. . | |

FOREIGN PATENT DOCUMENTS

| | | |
|---|---|---|
| 34 24 269 | 1/1986 | (DE) . |
| 35 09 404 | 9/1986 | (DE) . |
| 0 382 891 | 8/1990 | (EP) . |
| 0 522 320 | 1/1993 | (EP) . |

* cited by examiner

Primary Examiner—Danny Worrell

(57) ABSTRACT

In the method for manufacturing a cable (CA1), the individual leads (AD1 through ADn) are supplied to a stranding apparatus (RE, RA) that produces a stranded bundle (SB1), whereby the material (MMA1) for the cable cladding (MA1) is applied onto the stranded bundle (SB1) produced in this way with an extruder head (EK1), and the stranding point for the stranding lies in the region of the extruder head (EK1). The individual leads (AD1 through ADn) are already brought into contact with the material (MMA1) for the cable cladding (MA1) when or before they have just been completely stranded to form the stranded bundle (SB1).

9 Claims, 4 Drawing Sheets

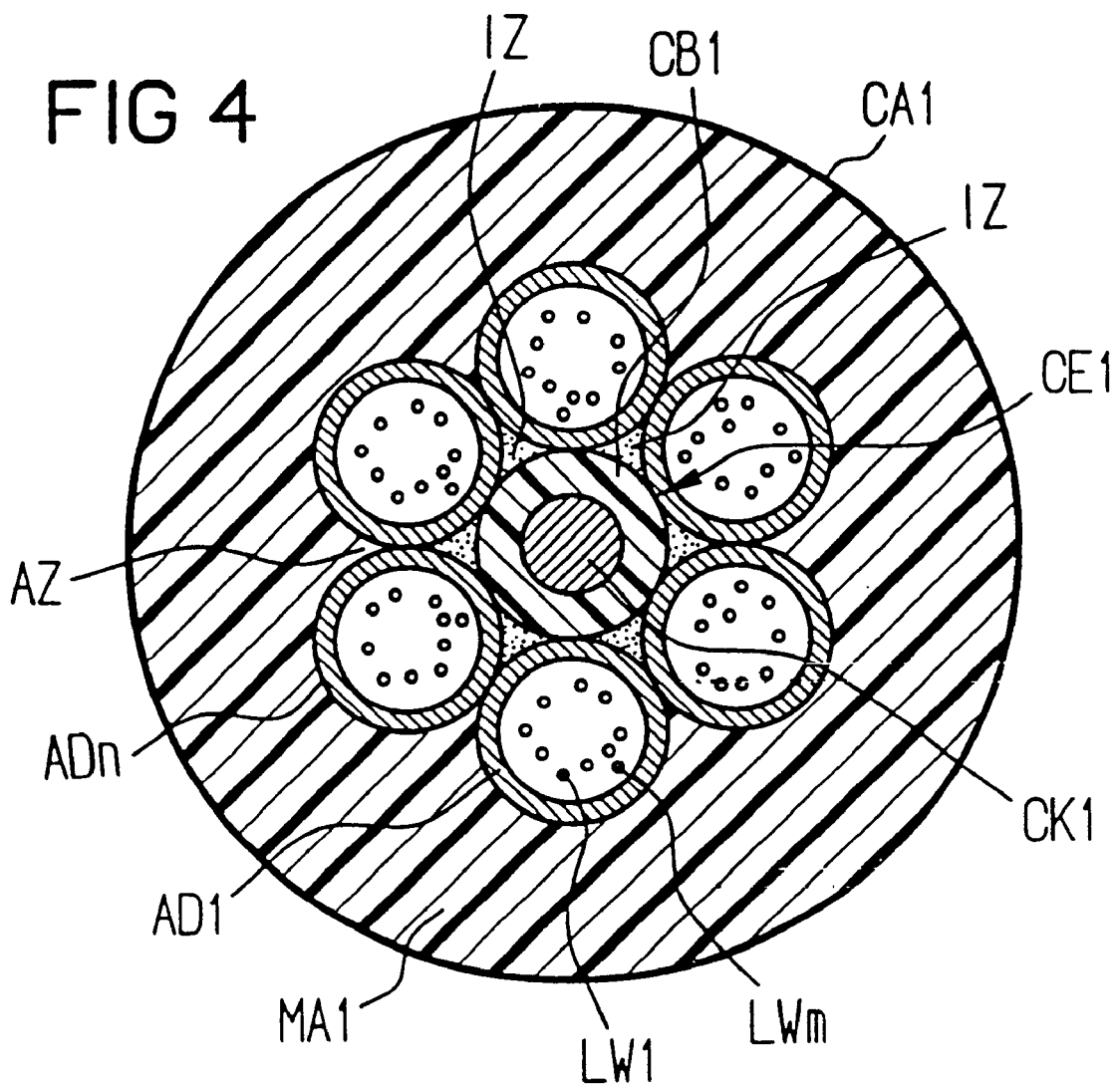

METHOD AND APPARATUS FOR PRODUCING A CABLE

BACKGROUND OF THE INVENTION

The invention is directed to a method for manufacturing a cable, whereby the individual leads are supplied to a stranding means that generates a stranded bundle, whereby the material for the cable cladding is applied onto the stranded bundle manufactured in this way with an extruder head, and the stranding point for the stranding lies in the region of the extruder head.

DE-A1 35 09 404 discloses a method of this species. The material for the cable cladding is thereby only applied onto the completely stranded bundle, so that there is an intermediate region wherein the stranded bundle as a whole is guided in a cylindrical guide sleeve. On the one hand, this structure lengthens the axial expanse of the extruder head and is less advantageous for various applications due to the subsequent application of the cladding material onto the stranded bundle.

The invention is based on the object of disclosing a way how the application of the cladding material can be more beneficially implemented. This object is achieved in a method of the species initially cited in that the individual leads are already brought into contact with the material for the cable cladding when or before they have been completely stranded to form the stranded bundle.

Since the individual leads are already brought into contact with the cladding material at the moment of their convergence or in the not yet completely stranded condition, this material can penetrate better into grooves and gaps, at least in the outside layer, and fix the leads. Further, the connection between cladding material on the one hand and the outside contour of the stranded bundle on the other hand is firmer in this way, so that the adhesion opposing a potential unraveling can be improved. The structural length of the manufacturing line (composed of stranding machine and cladding system) can generally also be reduced in this way because the leads need not first be merged completely into the bundle and the application of the cladding material is then subsequently undertaken at a greater distance; rather the stranding is directly integrated into the cladding machine.

The invention is also directed to an apparatus for manufacturing a cable with a stranding means to which individual leads are supplied for forming a stranded bundle, and whereby an extruder head is provided for application of a material for the cable cladding. This apparatus is characterized in that the individual leads are guided such in the inside of the extruder head that they come into contact with the material for the cable cladding when or before they are completely stranded to form the stranded bundle.

Developments of the invention are reflected in subclaims.

Figure 1:
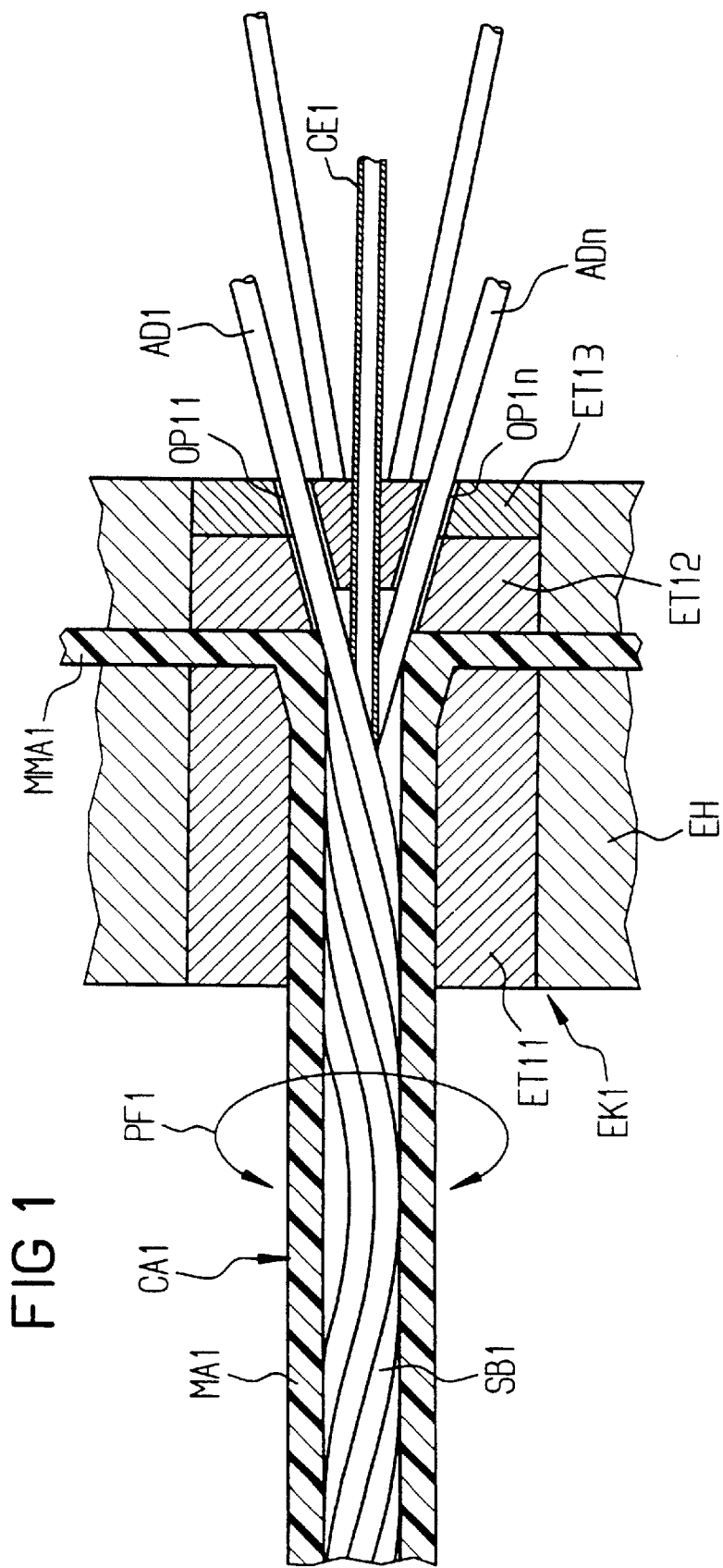
Figure 2:
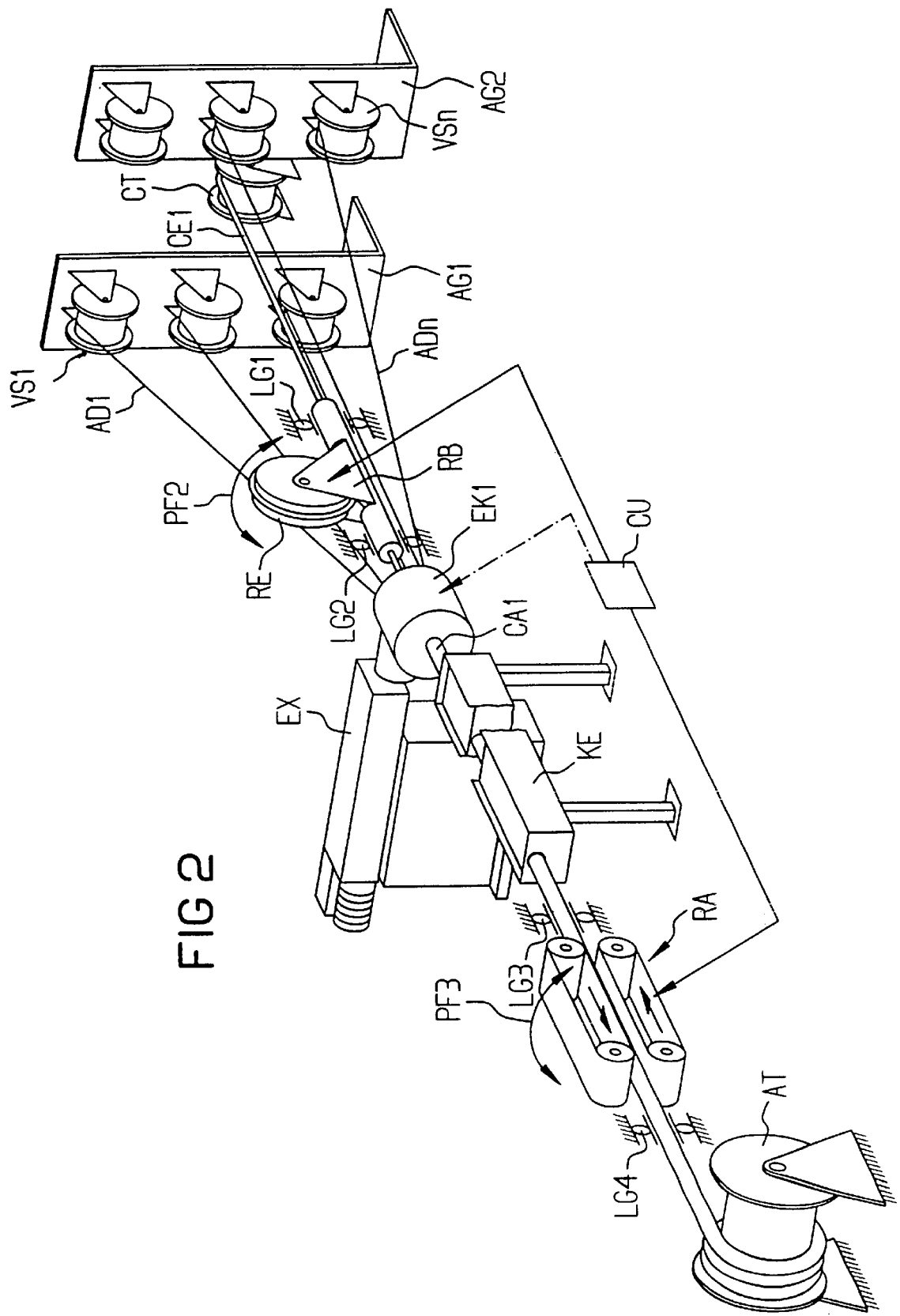
Figure 3:
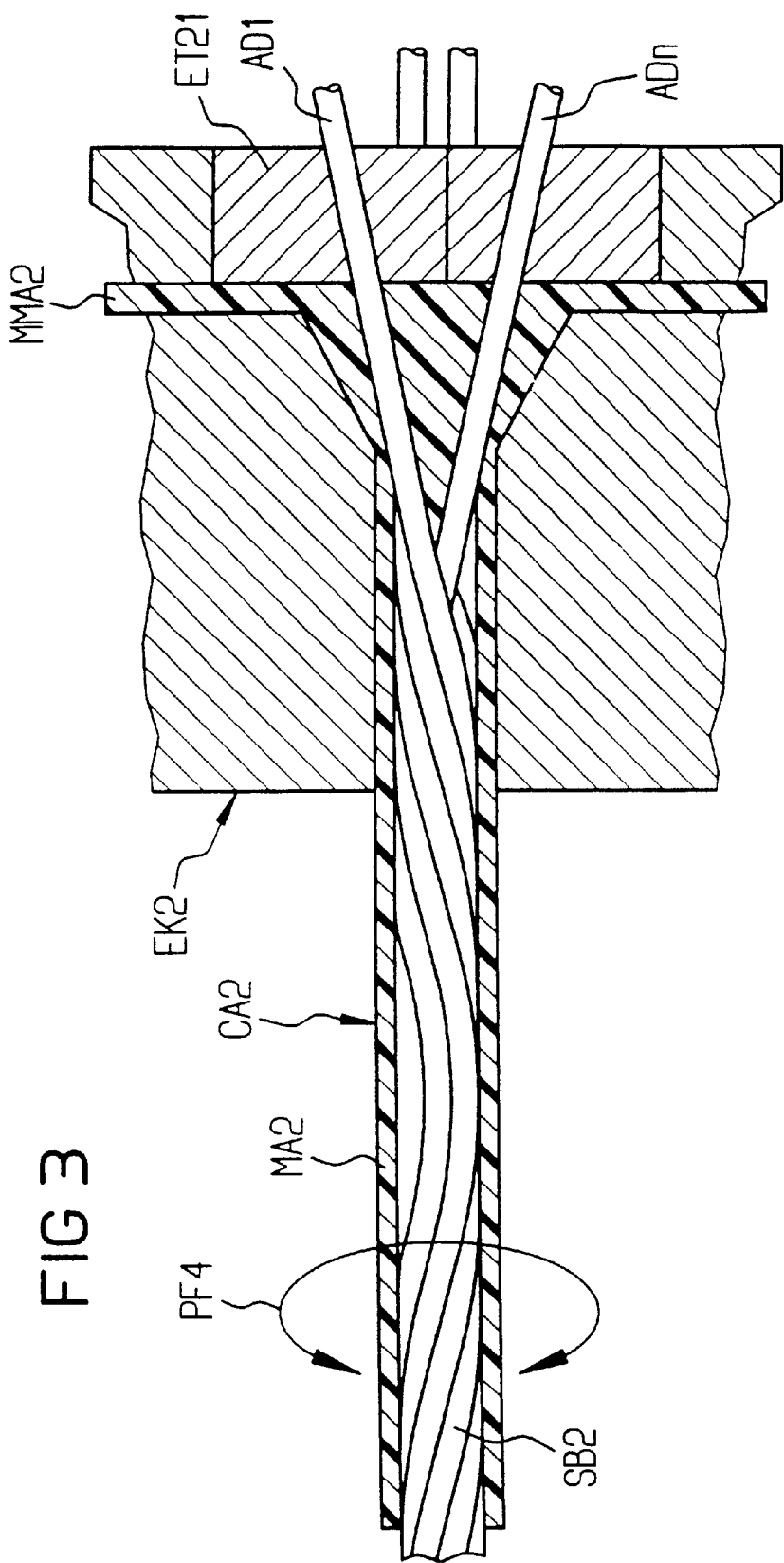

The invention and developments thereof are explained in greater detail below with reference to drawings. Shown are:

FIG. 1 a section through an extruder head with guidance of the leads according to the invention;

FIG. 2 a perspective illustration of a stranding means for application in the invention;

FIG. 3 a further exemplary embodiment of the invention with an extruder head shown in section; and FIG. 4 a cross section through a cable manufactured according to the invention.

FIG. 1 shows a section through an extruder head EK1 that comprises a sleeve-shaped outside body EH in whose bore inserts ET11, ET12 and ER13 are provided. Leads AD1–ADn enter from the right, these potentially being optical and/or electrical conductors. Given employment of optical conductors (light waveguides), these can be fashioned as solid or hollow leads, whereby the light waveguides—in the latter instance—are arranged in the inside of a tubular protective sheath and this is advantageously filled with a soft, pasty filling compound. Further, a tensile central element CE1 is provided onto which the leads AD1–ADn are stranded with the same or—as indicated by the arrow PF1—with changing stranding direction, so that a stranded bundle SB1 arises as the final result. An outside cladding MA1 is applied onto this stranded bundle SB1 in the extruder head EK1. The plastic material MA1 for this outside cladding is pressed into the extruder head EK1 in practically liquid form—by an extruder that is not shown here—and is thus applied onto the stranded bundle SB1.

The leads AD1–ADn as well as the central elements CE1 pass through bores that are applied in the input-side, disk-shaped inserts ET13 and ET12. These bores, which proceed obliquely inward in the direction of the traversal axis, are referenced OP11 through OP1n for the leads AD1 through ADn. The practically liquid cladding material MA1 reaches the individual leads AD1–ADn in a position wherein these are just being merged to form a stranded bundle and have not yet been completely combined to form the finished stranded bundle SB1. Expressed in other words, the leads AD1–ADn do not yet lie completely tightly against the central element CE1 but still exhibit a certain distance therefrom or, respectively, from one another, preferably between 0.5 and 2 mm.

As a result thereof, the material MMA1 still adequately proceeds into the gores between the individual leads AD1–ADn and largely fills these, as particularly follows from FIG. 4, which shows a cross section through a cable CA1 manufactured in this way. It can be seen therein that, in any case, the outer gores AZ are completely and deeply filled as a result of this way of delivering the cladding material and, thus, the stranded union is secured against unraveling, even given SZ-stranding. The leads AD1–ADn are indicated here as hollow leads in whose inside light waveguides LW1 through LWm are arranged, potentially embedded in a filling compound, preferably with excess length. The central core element CE1 is composed of a tensile core CK1 (for example, of steel wires or GFK elements), whereby a coating CB1, particularly of plastic material, can be potentially applied on the outside for achieving the necessary diameter values.

There are various possibilities of filling for the inside gore IZ, i.e. the gore between the central element CE1 and the individual leads AD1–ADn, in order to achieve longitudinal water tightness. First, it is possible to already pre-coat the central elements CE1 with a filling compound serving the purpose of achieving the necessary longitudinal tightness before the stranding of the individual leads AD1–ADn and to strand the leads AD1–ADn only thereafter. However, it is also possible to apply a band, fabricate or the like on the central element CE1 that is coated with a material that swells given the admission of water.

Since the material MMA1 for the cladding MA1 is supplied in soft form before or precisely at the convergence of the leads AD1–ADn in the ultimate stranded union, one can also proceed such that the material also proceeds toward the inside, i.e. up to the central element CE1, and thus also fills the inside gores IZ. This is particularly true when extremely liquid cladding material and/or high pressure are used. It is thus not usually necessary to provide an additionally filling compound for the inner gores IZ. The cladding material MMA1 advantageously encounters the various leads AD1–ADn in an annular gap arranged in the extruder head (see FIGS. 1 and 3), whereby the leads AD1–ADn are still separated laterally from one another by spacings in this condition, i.e. do not lie directly against one another. The material MMA1 can thus enter between the leads AD1–ADn in a simple way, and can thus also at least partially but preferably completely fill the inner gores IZ according to FIG. 4. When, in contrast, the cladding material MMA1 encounters the leads AD1–ADn when they are just touching one another, then only the outer gores AZ are essentially closed. All the more material proceeds into the inside and, preferably, to the central element CE1 as well the farther the leads AD1–ADn are distanced from one another when the admission of the material MMA1 ensues.

FIG. 2 shows a stranding apparatus with which a cable CA1 of FIG. 1 or FIG. 4 can be manufactured. Supply reels VS1–VSn on which leads AD1 through ADn are contained are provided on two haul-off racks AG1 and AG2. A supply drum CT is also present from which the central element CE1 is hauled off. It is assumed in the present example that the SZ-stranding is undertaken with the assistance of this central element CE1. To this end, this central element CE1 is conducted over a drum RE (with at least one wrap) whose rotational axis proceeds transversely relative to the traversal direction of the central element CE1 through the stranding apparatus. The drum RE is held in a bearing block RB that, together with the drum RE, is held rotatable around an axis at its end sides via bearings LG1 and LG2, this axis proceeding through the stranding apparatus parallel to the traversal direction of the central element CE1. Adequate space is to be provided for the rotation of the bearing block RB around the axis parallel to the traversal direction of the central element CE1, whereby this space is mainly dependent on the drum diameter of the drum RE. In reality, the haul-off racks AG1 and AG2 are arranged at a greater distance from one another than shown. The rotational sense of the bearing block RB is modified, preferably periodically, as indicated by the arrow PF2. The central element CE1 is thus twisted in alternation in the one direction and then back in the opposite direction, and is thus supplied to an extruder head EK1 whose sectional view is shown in FIG. 1. The appertaining extruder is referenced EX. Further, the leads AD1–ADn enter into the extruder head EK via corresponding openings in an input or guidance ring.

After passing through the extruder head EK, the cladding material, which is still hot and soft, is supplied to a cooling means KE (preferably, water cooling; advantageously, in counter-flow principle) and then proceeds to a caterpullar RA in the present example. This caterpullar RA serves, first, for pulling the individual leads AD1–ADn as well as the central element CE1 off and moving them forward, for which reason the belts the caterpullar RA enclose the cable CA1 and thus convey it forward from right to left. The caterpullar is additionally rotatably seated at one side via respective bearings LG3 and LG4. In addition to a drive for the two conveyor belts of the caterpullar RA, a further drive (not shown here) is to be provided that places the caterpullar RA in rotation around a respective axis proceeding parallel to the longitudinal axis of the cable CA1 in conformity with the arrow PF3, whereby the rotational sense is modified, preferably periodically. The circumferential speed and the rotational sense are respectively selected the same for the caterpullar RA and for the drum RE, so that the two are operated synchronized with one another, particularly by utilization of a common control means CU for both. It is also possible, as indicated with broken lines, to likewise have the extruder head EK1 co-rotate synchronized therewith. The caterpullar RA represents not only a means for moving the cable CA1 as well as the elements contained in it forward, but simultaneously acts as a stranding means together with the drum (twister) RE rotating at the input side. The two elements RE and RA serving for stranding enclose the extruder head EK1, as a result whereof the penetration events for the cladding material explained in greater detail in conjunction with FIG. 1 is assured. The finished cable CA1 is wound onto a take-up drum AT.

Instead of the illustrated stranding elements, for example the twister RE and the caterpullar RA, other known stranding means utilized in the framework of SZ-stranding can be employed. For example, a rotating caterpullar analogous to RA can be employed as well instead of the disk twister RE. Conversely, it is also possible to employ a rotating twister at the output instead of the caterpullar RA.

The extrusion nozzle of the extruder head EK can co-rotate synchronized with the stranding disk or, respectively, stranding crawler. Given a stationary extrusion nozzle, the stranding preferably occurs between extrusion nozzle and cooling trough where the cladding material is still plastic. It is also possible to conduct the leads to be stranded into the injection head without rotation and to apply the rotation required for the stranding (wrong lay or SZ) following the injection head. The outside cladding then rotates together with the stranding lay.

Instead of SZ-stranding, a long lay stranding can also be implemented with the stranding apparatus shown in FIG. 2 when the elements RE and RA rotate in only one direction, and when the take-up drum AT as well as the haul-off of the central element CE1 are also rotated.

FIG. 3 shows a section through an extruder head EK2 to which stranding elements AD1 through ADn are supplied. In contrast to FIG. 1, no central element is provided here, i.e. only individual leads AD1–ADn are stranded or, respectively, bunched with one another, namely likewise advantageously in different stranding directions, as indicated by the arrow PF4. The material MMA2 for the cladding MA2 of the cable CA2 to be produced likewise already encounters leads AD1 through ADn here at a point where these are still at an adequate distance from one another. This means that the entire inside of the stranded bundle SB2 is completely filled with the cladding material MMA2 without difficulty. For an extruder head according to FIG. 3, a tube store can also preferably be employed as stranding apparatus, this being arranged immediately before the admission into a rotating perforated or guide plate ET21 that serves for the introduction and forwarding of the leads AD1–ADn and which, accordingly, comprises bores arranged n-annularly. In the latter instance, the core is already stranded before the cladding material encounters the core. The cladding material in this case functions as rotation block.

What is claimed is:

1. A method for manufacturing a cable comprising the steps of providing a stranding apparatus which generates a stranded bundle comprised of a plurality of leads and has a stranding point, providing an extruder head for applying a cladding material for the stranded bundle adjacent the stranding point to thereby form a cable cladding surrounding the plurality of leads, supplying individual leads to the stranding apparatus, contacting the individual leads with the cladding material from the extruder head by the time that the leads are brought into the stranding point so that the leads are provided with the cladding material prior to being completely stranded to form the stranded bundle, and completing the stranding of the bundle with the stranding apparatus after the bundle has passed through the extruder head.

2. A method according to claim 1, which includes providing a central tensile element and stranding the leads thereon.

3. A method according to claim 2, wherein the step of providing a central tensile element provides an element coated with a soft filler material before it is introduced into the extruder head.

4. A method according to claim 1, wherein the cladding material is introduced onto the elements so that the cladding material fills the outside gores of the stranded bundle.

5. A method according to claim 1, wherein the cladding material is introduced on the individual leads before the leads are brought together so that the cladding material fills the inside gores of the stranded bundle.

6. A method according to claim 1, which further includes passing the stranded bundle with the cladding through a cooling means after it passes through the extruder head, and then advancing the stranded bundle to at least a portion of the stranding apparatus.

7. A method according to claim 1, which includes changing the stranding direction to produce an SZ-stranding.

8. An apparatus for manufacturing a cable with a stranding means in which individual leads are supplied to form a stranded bundle, said apparatus including an extruder head being provided for application of a cladding material on the bundle to-thereby form a cable cladding surrounding the plurality of leads with the improvement being the individual leads being guided in the inside of the extruder head as they come into contact with the cladding material prior to being completely stranded to form the stranded bundle, and at least a portion of the stranding means being arranged following said extruder head.

9. An apparatus according to claim 8, wherein the stranding apparatus includes means for changing the direction of stranding to produce an SZ-stranding.

* * * * *

UNITED STATES PATENT AND TRADEMARK OFFICE
CERTIFICATE OF CORRECTION

PATENT NO. : 6,318,061 B1
DATED : November 20, 2001
INVENTOR(S) : Reiner Schneider, Edgar Heinz and Thomas Mueller It is certified that error appears in the above-identified patent and that said Letters Patent is hereby corrected as shown below:

Column 1,
Line 13, delete "thereby";
Line 20, after "bundle." insert the following heading:
-- SUMMARY OF THE INVENTION --;
Line 49, delete "such";
Line 55, delete "Shown are:" and insert the following heading:
-- BRIEF DESCRIPTION OF THE DRAWINGS --;
Line 56, after "FIG. 1" insert -- is --;
Line 58, after "FIG. 2" insert -- is --;
Line 60, after "FIG. 3" insert -- is --; and Column 6,
Line 19, insert -- 10. An apparatus according to claim 8, wherein the means for changing the stranding direction are arranged both preceding and following the extruder head. --

Signed and Sealed this

Twenty-ninth Day of April, 2003

JAMES E. ROGAN
*Director of the United States Patent and Trademark Office*